United States Patent
Jin

(10) Patent No.: US 11,474,535 B2
(45) Date of Patent: Oct. 18, 2022

(54) METHOD OF PROCESSING DATA, APPARATUS FOR PROCESSING DATA, AND SYSTEM FOR CONTROLLING VEHICLE

(71) Applicant: HL KLEMOVE CORP., Incheon (KR)

(72) Inventor: Ho Young Jin, Seoul (KR)

(73) Assignee: HL Klemove Corp., Incheon (KR)

( * ) Notice: Subject to any disclaimer, the term of this patent is extended or adjusted under 35 U.S.C. 154(b) by 369 days.

(21) Appl. No.: 16/596,631

(22) Filed: Oct. 8, 2019

(65) Prior Publication Data

US 2020/0110419 A1   Apr. 9, 2020

(30) Foreign Application Priority Data

Oct. 8, 2018   (KR) .......................... 10-2018-0120064

(51) Int. Cl.
  *G05D 1/02*   (2020.01)
  *G01S 13/86*   (2006.01)
  *G01S 13/52*   (2006.01)

(52) U.S. Cl.
  CPC ............ *G05D 1/0257* (2013.01); *G01S 13/52* (2013.01); *G01S 13/867* (2013.01); *G05D 1/0246* (2013.01); *G05D 2201/0213* (2013.01)

(58) Field of Classification Search
  None
  See application file for complete search history.

(56) References Cited

U.S. PATENT DOCUMENTS

| | | | | |
|---|---|---|---|---|
| 2013/0177237 A1* | 7/2013 | Schamp | ................. | G06V 20/58 |
| | | | | 382/154 |
| 2016/0161597 A1* | 6/2016 | Treptow | ................. | G01S 13/424 |
| | | | | 342/174 |
| 2020/0110419 A1* | 4/2020 | Jin | ........................ | G05D 1/0257 |
| 2020/0175694 A1* | 6/2020 | Kato | .......................... | G06T 7/90 |
| 2021/0334501 A1* | 10/2021 | Song | .................. | G06V 40/1394 |
| 2022/0057203 A1* | 2/2022 | Tayu | ....................... | G01S 17/42 |

FOREIGN PATENT DOCUMENTS

| | | |
|---|---|---|
| JP | 3385304 | 3/2003 |
| JP | 5091651 | 12/2012 |
| KR | 10-2015-0134063 | 12/2015 |
| KR | 101848198 B * | 5/2018 |

* cited by examiner

*Primary Examiner* — Thomas Ingram
(74) *Attorney, Agent, or Firm* — Ladas & Parry, LLP

(57) ABSTRACT

Disclosed are a method of processing data, an apparatus for processing data, and a system for controlling a vehicle. The apparatus includes: a track sorter, configured to select a reference track from among a plurality of tracks generated based on sensing data captured by a radar sensor and to sort one or more sorted tracks that satisfy a preset filter condition, based on the reference track; a histogram generator, configured to extract transverse location information of the reference track and the one or more sorted tracks for a preset period and generate a short-term histogram and a long-term histogram having transverse locations of the reference track and each of the sorted tracks as factors; and an identifier configured to identify a mirror track based on a histogram similarity using the short-term histogram and the long-term histogram for the reference track and each of the sorted tracks. According to the present disclosure, there is an effect of increasing driving safety by accurately identifying a mirror track.

20 Claims, 15 Drawing Sheets

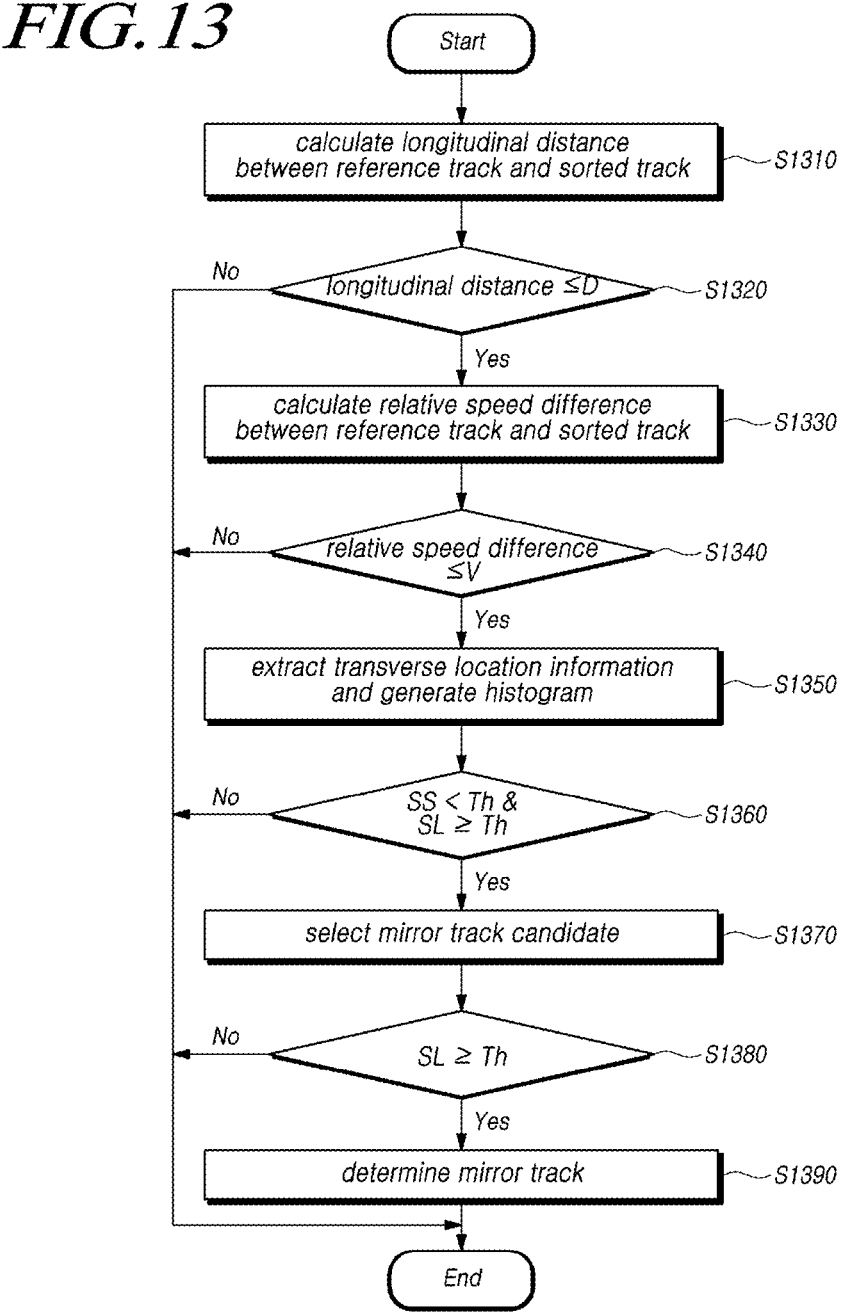

METHOD OF PROCESSING DATA, APPARATUS FOR PROCESSING DATA, AND SYSTEM FOR CONTROLLING VEHICLE

CROSS REFERENCE TO RELATED APPLICATION

This application claims priority from Korean Patent Application No. 10-2018-0120064, filed on Oct. 8, 2018, which is hereby incorporated by reference for all purposes as if fully set forth herein.

BACKGROUND OF THE INVENTION

1. Field of the Invention

The present disclosure relates to a method of processing data, an apparatus for processing data, and a system for controlling a vehicle.

2. Description of the Prior Art

An autonomous vehicle can perform autonomous driving using Advanced Driver Assistance Systems (ADAS) such as Adaptive Cruise Control (ACC), Smart Cruise Control (SCC), and Autonomous Emergency Braking (AEB).

Basic elements of the ADAS for autonomous driving are various sensors and a control device. Above all, the functionality of sensors for detecting an object is important for efficient and accurate display functions of the ADAS. Particularly, a radar sensor is frequently used because the radar sensor can detect an object and measure the distance to the object and the speed relative thereto.

The radar sensor may transmit a radar signal, receive radar signals reflected from objects, and generate tracks corresponding to the objects so as to detect the objects. At this time, the generated tracks include tracks corresponding to objects and tracks corresponding to virtual images of the objects. The tracks corresponding to the virtual images are mirror tracks.

Since a mirror track is generated using a virtual image of the object, mistaking the mirror track for an actual object is one of the causes of incorrect control of a vehicle.

Accordingly, it is important for an ADAS using a radar sensor to accurately identify mirror tracks, and development of technology therefor is required.

SUMMARY OF THE INVENTION

Against this background, an aspect of the present disclosure is to provide a method of processing data, an apparatus for processing data, and a system for controlling a vehicle that can accurately identify a mirror track.

Another aspect of the present disclosure is to provide a method of processing data, an apparatus for processing data, and a system for controlling a vehicle that can prevent accidents and realize driving safety by accurately identifying a mirror track which may cause risk.

In accordance with an aspect of the present disclosure, an apparatus for processing data is provided. The apparatus includes: an image sensor operable to be disposed at a vehicle so as to have a field of view of an exterior of the vehicle, the image sensor being configured to capture image data; a radar sensor operable to be disposed at the vehicle so as to have a sensing area of an exterior of the vehicle, the radar sensor being configured to capture sensing data; a controller comprising at least one processor configured to process at least the image data captured by the image sensor and the sensing data captured by the radar sensor; wherein the controller designates a reference track and one or more sorted tracks among a plurality of tracks generated based on a result of processing at least one of the image data and the sensing data, extracts transverse location information of each of the reference track and each of the one or more sorted tracks, generates histograms of transverse locations of the reference track and each of the one or more sorted tracks, compares the histograms, and identifies a mirror track among the reference track and the one or more sorted tracks based on a result of the comparison.

In another aspect of the present disclosure, an apparatus for processing data is provided. The apparatus includes: a track sorter configured to select a reference track from among a plurality of tracks generated based on sensing data captured by a radar sensor and sort one or more sorted tracks that satisfy a preset filter condition, based on the reference track; a histogram generator configured to extract transverse location information of the reference track and the one or more sorted tracks for a preset period and generate a short-term histogram and a long-term histogram having transverse locations of the reference track and each of the sorted tracks as factors; and an identifier configured to identify a mirror track based on histogram similarity using the short-term histogram and the long-term histogram for the reference track and each of the sorted tracks.

In another aspect of the present disclosure, a system for controlling a vehicle is provided. The system includes: an image sensor operable to be disposed at a vehicle so as to have a field of view of an exterior of the vehicle, the image sensor being configured to capture image data; a radar sensor operable to be disposed at the vehicle so as to have a sensing area of an exterior of the vehicle, the radar sensor being configured to capture sensing data; an adaptive cruise control module configured to control the traveling speed of the vehicle to a target traveling speed while maintaining a predetermined interval between the vehicle and a preceding target; and a domain control unit configured to process at least one of the image data captured by the image sensor and the sensing data captured by the radar sensor and identify a mirror track to allow the vehicle to follow the preceding target, wherein the domain control unit designates a reference track and one or more sorted tracks among a plurality of tracks generated based on a result of processing at least one of the image data and the sensing data, extracts transverse location information of each of the reference track and each of the one or more sorted tracks, generates histograms of transverse locations of the reference track and each of the one or more sorted tracks, compares the histograms, and identifies a mirror track among the reference track and the one or more sorted tracks, based on a result of the comparison.

In another aspect of the present disclosure, disclosed is an image sensor disposed at a vehicle so as to have a field of view of an exterior of the vehicle and configured to capture image data, the image data being used to extract transverse location information of each of a designated reference track and one or more sorted tracks among a plurality of generated tracks and used to identify a mirror track among the reference track and the one or more sorted tracks, based on a result of comparison between histograms of transverse locations of the reference track and the one or more sorted tracks.

In another aspect of the present disclosure, a method of processing data is provided. The method includes: selecting a reference track from among a plurality of generated tracks, based on sensing data captured by a radar sensor and sorting one or more sorted tracks that satisfy a preset filter condition, based on the reference track; extracting transverse location information of the reference track and the one or more sorted tracks for a preset period and generating a short-term histogram and a long-term histogram having transverse locations of the reference track and each of the sorted tracks as factors; and identifying a mirror track based on histogram similarity using the short-term histogram and the long-term histogram for the reference track and each of the sorted tracks.

As described above, the present disclosure can provide a method of processing data, an apparatus for processing data, and a system of controlling a vehicle which can accurately identify a mirror track.

Further, the present disclosure can provide a method of processing data, an apparatus for processing data, and a system of controlling a vehicle that can prevent accidents and realize driving safety by accurately identifying a mirror track which may cause risk.

BRIEF DESCRIPTION OF THE DRAWINGS

The above and other aspects, features and advantages of the present disclosure will be more apparent from the following detailed description taken in conjunction with the accompanying drawings, in which:

FIG. 13 is a flowchart illustrating another embodiment of the radar-signal-processing method according to the present disclosure.

DETAILED DESCRIPTION OF THE EXEMPLARY EMBODIMENTS

Hereinafter, embodiments of the present disclosure will be described in detail with reference to the accompanying drawings. In the description of the elements of the present disclosure, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
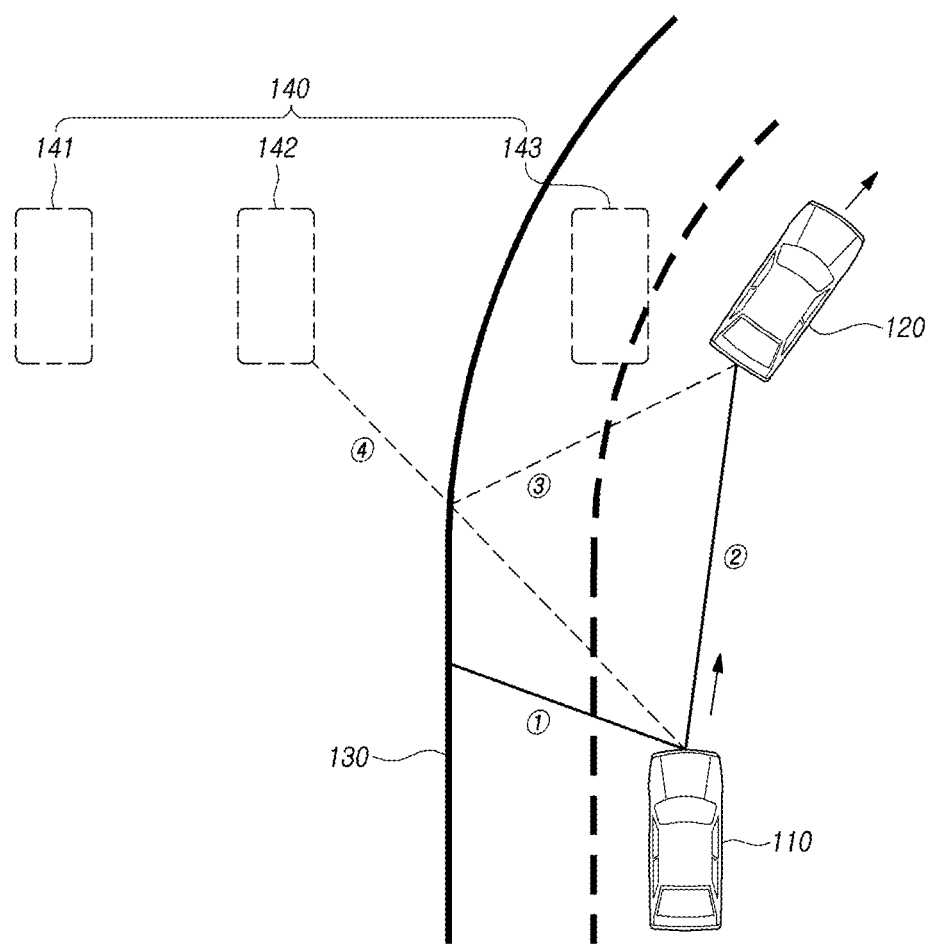
FIG. 1 illustrates a situation in which a radar sensor mounted to a vehicle transmits and receives a signal according to the present disclosure.

FIG. 1 illustrates a situation in which a radar sensor mounted to a vehicle 110 according to the present disclosure transmits and receives a signal.

Referring to FIG. 1, the traveling vehicle 110 may detect a preceding target 120 for autonomous driving.

In SCC for controlling a vehicle to travel at a constant speed while maintaining a predetermined distance from the preceding target, the radar sensor mounted to the traveling vehicle 110 detects and traces the preceding target 120, and a controller mounted to the vehicle 110 controls the distance from the preceding target 120 and the speed of the vehicle 110.

The radar sensor may capture sensing data and detect the front, side, and rear of the vehicle. Specifically, the radar sensor transmits a signal in a forward direction of the vehicle 110 and receives signals reflected from a plurality of objects ahead.

The signal transmitted from the radar sensor may reach the object directly or after being reflected from a structure such as a guardrail 130.

For example, the transmitted signal may directly reach the guardrail 130 through path ①.

In another example, the transmitted signal may directly reach a preceding target 120 through path ②, or may reach the preceding target 120 after being reflected from the guardrail 130 through path ③.

The signal reaching the object is reflected and reaches the radar sensor through the same path.

For example, the signal reaching the guardrail 130 through path ① is reflected and reaches the radar sensor through path ①.

In another example, the signal reaching the preceding target 120 through path ③ is reflected and reaches the radar sensor through path ③.

In the case of path ③, the radar sensor recognizes the signal received through path ③ as a signal received through path ④, which is symmetrical therewith based on a guardrail reflection point.

When the signal is received through path ④, the radar sensor detects a virtual image (or mirror) 140 located on path ④.

For example, when the signal reaching the preceding target 120 through path ③ is reflected from the preceding target 120 and reaches the radar sensor through path ③, the radar sensor detects the virtual image 140 located on path ④.

The location of the detected virtual image 140 may be fixed, but may be changed by the performance of the radar sensor or the outside environment.

Particularly, the location of the virtual image 140 may be inaccurate when the intensity of the signal transmitted by the radar sensor is weak or in an environment in which diffuse reflections are severe, such as a tunnel. When the signal fluctuates significantly, the virtual image 140 may be located on a road.

When the radar sensor detects the virtual image 140 located on the road, the virtual image 140 may be treated as another vehicle traveling on the road based on the radar sensor. Hereinafter, the above-described problem of the tracks generated by the radar sensor will be described in detail.

Figure 2:
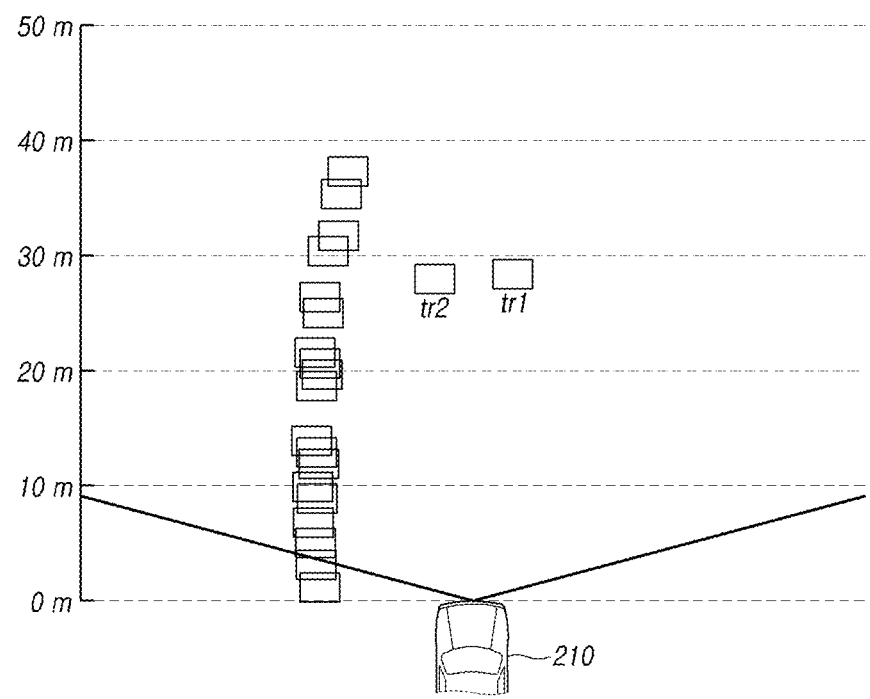
FIG. 2 illustrates tracks generated on the basis of information received through the radar sensor according to the present disclosure.

FIG. 2 illustrates tracks generated on the basis of information received through the radar sensor according to the present disclosure.

Referring to FIG. 2, the radar sensor according to the present disclosure may receive a signal reflected from an object and generate a track corresponding to the object so as to measure the location of the object and the distance between the vehicle 110 and the object.

Referring to FIGS. 1 and 2, the radar sensor indicates the detected preceding target 120 using track 1 (tr1) and the detected virtual image 140 using track 2 (tr2), that is, a mirror track.

Further, the radar sensor may indicate a plurality of points reflected from the guardrail 130 by tracks (tr).

As described above, since the location of the virtual image 140 is very inaccurate when the signal transmitted by the radar sensor is weak or in an environment in which diffuse reflections are severe, such as a tunnel, the location of track 2 (tr2) is also very inaccurate. At this time, track 2 (tr2) may be located very close to track 1 (tr1) at a particular time.

In this case, when the ADAS, for example, SCC, is performed, the radar sensor may recognize track 2 (tr2), which is the mirror track, as the preceding target 120, and may thus follow track 2 (tr2) even though the radar sensor should follow track 1 (tr1).

Accordingly, the present disclosure provides a vehicle control system, a data-processing device, an image sensor, and a data-processing method to solve the above problem.

Figure 3A:
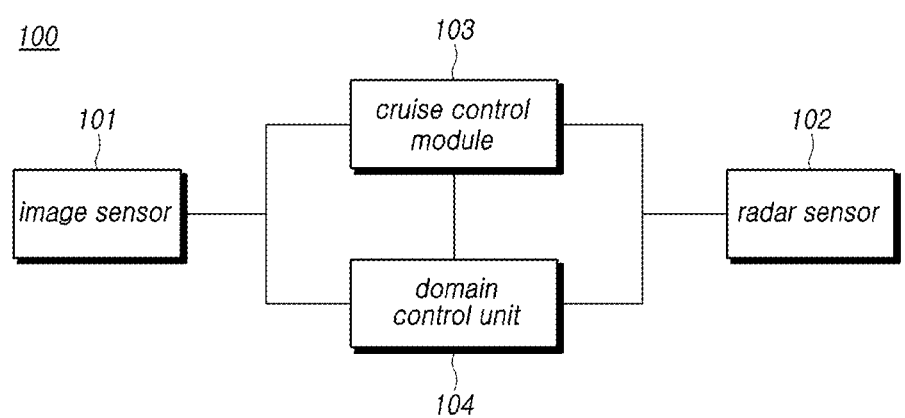
FIG. 3A illustrates a vehicle control system according to the present disclosure.

FIG. 3A illustrates a vehicle control system 100 according to the present disclosure.

Referring to FIG. 3A, the vehicle 110 according to the present disclosure includes the vehicle control system 100 for controlling the vehicle 110 while distinguishing the preceding target 120 from the virtual image 140.

That is, the vehicle control system 100 of the vehicle 110 includes an image sensor 101 disposed in the vehicle 110 to have a field of view of an exterior of the vehicle 110 and configured to capture image data, the radar sensor 102 disposed at the vehicle 110 so as to have a sensing area of an exterior of the vehicle 110 and configured to capture sensing data, the adaptive cruise control module 103 configured to control the traveling speed of the vehicle 110 to a target traveling speed while maintaining a predetermined interval between the vehicle 110 and the preceding target 120; and the domain control unit 104 configured to process at least one of the image data captured by the image sensor 101 and the sensing data captured by the radar sensor 102 and identify a mirror track to allow the vehicle 110 to follow the preceding target 120.

The image sensor 101 may be disposed in the vehicle 110 to have a field of view of an exterior of the vehicle 110. At least one image sensor 101 may be mounted to respective parts of the vehicle 110 to have a field of view of the front, side, or rear of the vehicle 110.

Image information captured by the image sensor 101 consists of image data, which corresponds to image data captured by the image sensor 101. Hereinafter, image information captured by the image sensor 101 is image data captured by the image sensor 101.

The image data captured by the image sensor 101 may be generated, for example, in one format selected from among AVI, MPEG-4, H.264, DivX, and JPEG in a raw form. The image data captured by the image sensor 101 may be processed by a processor.

The integrated controller 104 may be configured to receive image data, receive sensing data captured by the radar sensor, and process at least one piece of the image data and the sensing data. For the processing, the integrated controller may include at least one processor.

The integrated controller 104 may be included in the vehicle 110, and may communicate with at least one image sensor 101 and at least one radar sensor 102 mounted in the vehicle 110. To this end, an appropriate data link or communication link, such as a vehicle network bus for data transmission or signal communication, may be further included.

The integrated controller 104 may designate a reference track and one or more sorted tracks among a plurality of tracks generated on the basis of the result of processing at least one of the image data and the sensing data, extract transverse location information of each of the reference track and the one or more sorted tracks, generate a histogram of the transverse location of each of the reference track and the one or more sorted tracks, compare histograms, and identify a mirror track among the reference track and the one or more sorted tracks on the basis of the comparison result.

The integrated controller may be implemented as a Domain Control Unit (DCU).

In this specification, an ultrasonic sensor or a lidar sensor, as well as the radar sensor, may be applied.

In this specification, an AEB system or a BSD system, as well as the cruise control of the ADAS, may be applied.

The vehicle control system 100 may be implemented as a data-processing device for processing data to identify a mirror track. Accordingly, hereinafter, the data-processing device according to the present disclosure will be described.

Figure 3B:
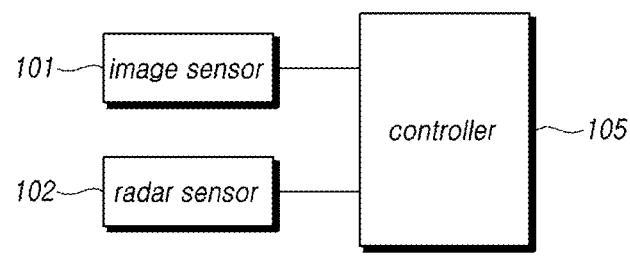
FIG. 3B illustrates the configuration of a first data-processing device according to the present disclosure.

FIG. 3B illustrates the configuration of a first data-processing device 200 according to the present disclosure.

Referring to FIG. 3B, the first data-processing device 200 according to the present disclosure includes the image sensor 101 disposed in the vehicle 110 to have a field of view of an exterior of the vehicle 110 and configured to capture image data, a radar sensor 102 disposed in the vehicle 110 to have a sensing area of an exterior of the vehicle 110 and configured to capture sensing data, and a controller 105 including at least one processor configured to process at least one piece of the image data captured by the image sensor 101 and the sensing data captured by the radar sensor.

The controller may designate a reference track and one or more sorted tracks among a plurality of tracks generated on the basis of the result of processing at least one piece of the image data and the sensing data, extract transverse location information of each of the reference track and the one or more sorted tracks, generate a histogram of the transverse location of each of the reference track and the one or more sorted tracks, compare histograms, and identify a mirror track among the reference track and the one or more sorted tracks on the basis of the comparison result.

Meanwhile, the mirror track may be identified using the sensing data captured by the radar sensor 102. Hereinafter, the data-processing device for determining the mirror track on the basis of sensing data of the radar sensor will be described.

Figure 3C:
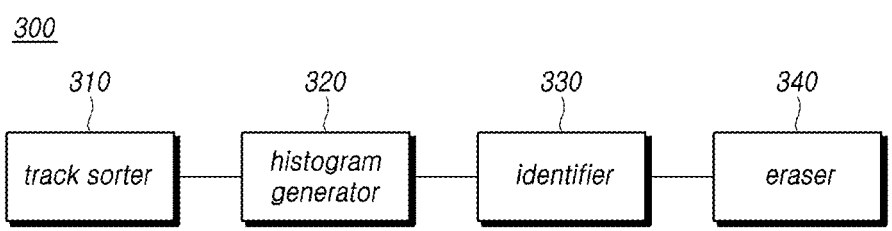
FIG. 3C illustrates the configuration of a second data-processing device according to the present disclosure.

FIG. 3C illustrates the configuration of a second data-processing device 300 according to the present disclosure.

Referring to FIG. 3C, the second data-processing device 300 according to the present disclosure may include a track sorter 310, a histogram generator 320, and an identifier 330.

The track sorter 310 may select a reference track from among a plurality of tracks generated on the basis of sensing data captured by the radar sensor 102 and sort one or more sorted tracks that satisfy a preset filter condition on the basis of the reference track.

The reference track is a track which is a reference for determining a track that satisfies a filter condition. For example, the track determined as a target according to the processing of the conventional sensing data may be selected as the reference track.

The sorted track is a track that satisfies the filter condition among the plurality of tracks, and the number thereof may be one or more.

The filter condition is a condition set to sort the sorted track, and the number thereof may be one or more.

For example, the longitudinal distance between tracks or the relative speed difference between tracks may be used as the filter condition, without limitation thereto.

The histogram generator 320 may extract transverse location information of the reference track and one or more sorted tracks for a preset period and generate a short-term histogram and a long-term histogram having the transverse location for each of the reference track and the sorted tracks as a factor.

The terms "long-term" and "short-term" indicate preset times or preset periods, and the preset period is a period set according to the road driving conditions. Accordingly, the period may be differently configured for various road driving conditions.

For example, when the preceding target 120 changes lanes during traveling, a time at which the lane change occurs may be set as a first period and a time a preset period after the time at which the lane change is started may be set as a second period. However, the present disclosure is not limited thereto.

Similar to the above example, the short term described in this specification may be a time corresponding to the situation in which the location of the object fluctuates significantly and the long term may be a time configured to be longer than the short term.

The histogram is a graph indicating a distribution state in which the horizontal axis indicates the class and the vertical axis indicates the number of cases (or frequencies).

The histogram generator 320 may classify the preset period into two or more periods and extract transverse location information for each of the periods to generate histograms.

For example, the histogram generator 320 may preset a first period and a second period longer than the first period, extract transverse location information for the first period to generate a short-term histogram, and extract transverse location information for the second period to generate a long-term histogram.

The first period may correspond to the short term and the second period may correspond to the long term.

The identifier 330 may identify a mirror track on the basis of histogram similarity using the short-term histogram and the long-term histogram for each of the reference track and the sorted tracks.

The histogram similarity is a numerical value indicating a similarity level between histograms. The histogram similarity may be measured using open-source, a coefficient of Bhattacharyya, a chi-square, a correlation, and a cross.

For example, the identifier 330 may compare similarity levels between all forms of the generated histogram through OpenCV and indicate the result thereof as a numerical value.

In another example, since a probability of the class can be calculated through a ratio of the number of cases in a particular class (particularly, transverse location) to a total number of cases, the identifier 330 may use the probability.

That is, the identifier 330 may calculate the probability of each class in each of the two generated histograms, calculate the coefficient of Bhattacharyya between the two histograms, and compare the similarity levels between the two histograms.

The two histograms are not similar to each other when the coefficient of Bhattacharyya approaches 0, and are similar to each other when the coefficient of Bhattacharyya approaches 1.

The identifier 330 may compare the histogram similarity between histograms of the reference track and the plurality of respective sorted tracks at one time, or may compare the histogram similarity between histograms of the reference track and each sorted track selected from the plurality of selected tracks. However, the present disclosure is not limited thereto.

The second data-processing device 300 according to the present disclosure may further include an eraser 340 for erasing the mirror track when the identifier 330 identifies the mirror track.

The elements included in the second data-processing device 300 may be implemented as hardware, such as an Electronic Control Unit (ECU), a Domain Control Unit (DCU), a Micro Controller Unit (MCU), and an Integrated Circuit (IC), and software implementing an algorithm.

The elements included in the second data-processing device 300 may transmit and receive signals to and from each other through Controller-Area-Network (CAN) communication.

Hereinafter, an embodiment of an operation for selecting a reference track from among a plurality of tracks and sorting a sorted track that satisfies a filter condition will be described.

Figure 4:
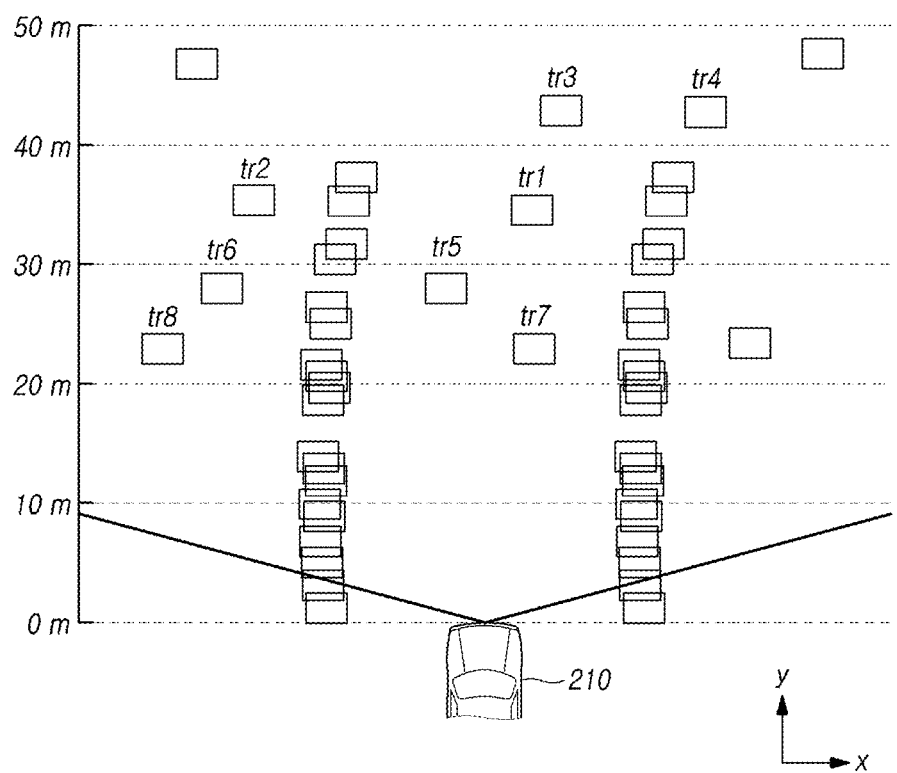
FIG. 4 illustrates an embodiment of selecting a reference track from among a plurality of tracks.

FIG. 4 illustrates an embodiment of selecting a reference track from among a plurality of tracks.

Referring to FIG. 4, the radar sensor mounted to the traveling vehicle 110 transmits a signal in a forward direction of the vehicle 110, receives signals reflected from a plurality of objects ahead, and generates a plurality of tracks on the basis of the received signals.

For example, when there are one or more preceding targets 120 ahead of the vehicle 110, the guardrail 130 installed at the edge of a road, and the virtual image 140, the one or more preceding targets 120 and the virtual image 140 are indicated by track 1 (tr1) to track 8 (tr8) and the guardrail 130 is indicated by overlapping or neighboring tracks.

At this time, the track sorter 310 may randomly select a reference track from among a plurality of tracks.

For example, the track sorter 310 may select a track determined as the target as the reference track according to the conventional sensing-data-processing algorithm.

In another example, the track sorter 310 may select track 1 (tr1) as the reference track among track 1 (tr1), track 3 (tr3), track 5 (tr5), and track 7 (tr7), located within a preset x-axis range, on the basis of a vehicle image 210. However, the present disclosure is not limited thereto.

When the reference track is selected, the track sorter 310 may sort a sorted track that satisfies a preset filter condition.

Hereinafter, a detailed method of sorting a sorted track that satisfies a filter condition will be described. However, track 1 (tr1) is selected as the reference track for convenience of description, and thus track 1 (tr1) is expressed and described as reference track (tr1) unless specifically mentioned otherwise.

Figure 5:
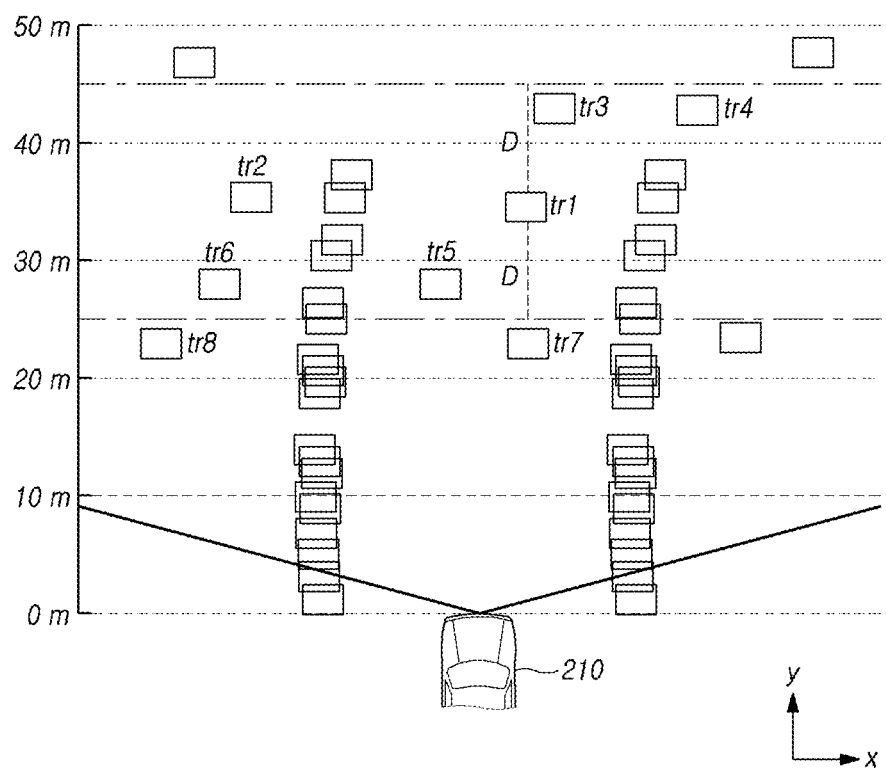
FIG. 5 illustrates an embodiment of sorting a sorted track that satisfies a filter condition.

FIG. 5 illustrates an embodiment of sorting a sorted track that satisfies a filter condition.

An actual track corresponding to the preceding target 120 and a mirror track corresponding to the virtual image 140 of the preceding target 120 have similar longitudinal locations.

Accordingly, in order to identify the mirror track generated by the reference track, it is required to sort tracks located within a predetermined distance from the location of the reference track.

Referring to FIG. 5, on the basis of the reference track (tr1), the track sorter 310 may sort, as the sorted track, a track having a longitudinal distance from the reference track (tr1) equal to or shorter than a preset reference distance among the plurality of tracks.

For example, the track sorter 310 may configure a reference distance D spaced apart upward and downward from the reference track (tr1) on the basis of the location of the reference track (tr1) and a y-axis direction. The track sorter 310 sorts track 2 (tr2) to track 6 (tr6) and other tracks located within the reference distance D as sorted tracks.

As described above, the track sorter 310 may sort tracks that satisfy a preset filter condition as sorted tracks on the basis of the reference distance, and may sort tracks that satisfy the preset filter condition as sorted tracks on the basis of a relative speed difference.

For example, the track sorter 310 may calculate a relative speed difference between the tracks illustrated in FIG. 5 and the reference track (tr1) instead of the reference distance D, and may sort tracks having the relative speed difference equal to or lower than a reference speed as sorted tracks.

Further, the track sorter 310 may sort sorted tracks that satisfy a preset filter condition on the basis of both the reference distance and the relative speed difference.

Hereinafter, a method of sorting sorted tracks on the basis of the relative speed difference between the reference track and tracks located within the reference distance will be described.

Figure 6:
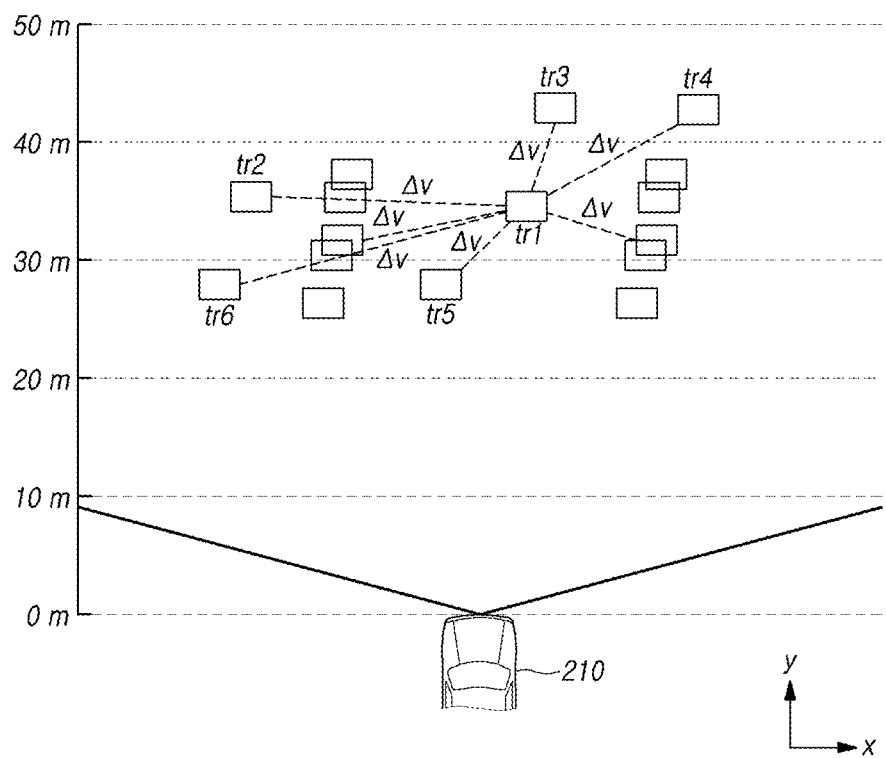
FIG. 6 illustrates another embodiment of sorting sorted tracks that satisfy a filter condition.

FIG. 6 illustrates another embodiment of sorting sorted tracks that satisfy a filter condition.

An actual track and a mirror track corresponding to the actual track have similar longitudinal locations, and the relative speeds thereof are also similar.

Accordingly, in order to identify the mirror track generated by the reference track, it is required to sort tracks having a relative speed difference from the reference track, which is equal to or lower than a predetermined speed.

Referring to FIG. 6, the track sorter 310 may calculate a relative speed difference ($\Delta v$) between the reference track (tr1) and the plurality of tracks on the basis of the reference track (tr1), and may sort a track having a relative speed difference ($\Delta v$) equal to or lower than a preset reference speed as a sorted track.

For example, the track sorter 310 may calculate the relative speed difference ($\Delta v$) between the reference track (tr1) and track 2 (tr2), and when the relative speed difference ($\Delta v$) between the reference track (tr1) and track 2 (tr2) is equal to or lower than a reference speed, may sort track 2 (tr2) as the sorted track.

In another example, the track sorter 310 may calculate the relative speed difference ($\Delta v$) between the reference track (tr1) and track 5 (tr5), and when the relative speed difference ($\Delta v$) between the reference track (tr1) and track 5 (tr5) is larger than a reference speed, may exclude track 5 (tr5).

As described above, the data-processing device according to the present disclosure may accurately identify the mirror track by excluding tracks irrelevant to the mirror track.

However, although the track sorter 310 sorts one or more sorted tracks that satisfy a filter condition, it is difficult to immediately identify the mirror track among the reference track and the sorted track.

Accordingly, it is required to select candidates for identifying the mirror track from among the reference track and the sorted track and identify the mirror track among the selected candidates.

Hereinafter, a detailed method of selecting mirror track candidates from among the reference track and sorted tracks sorted under a filter condition will be described, in which case track 1 (tr1) is the reference track and track 2 (tr2) to track 4 (tr4) are sorted tracks for convenience of description. Further, unless specifically mentioned otherwise, track 1 (tr1) is expressed and described as the reference track (tr1).

Figure 7:
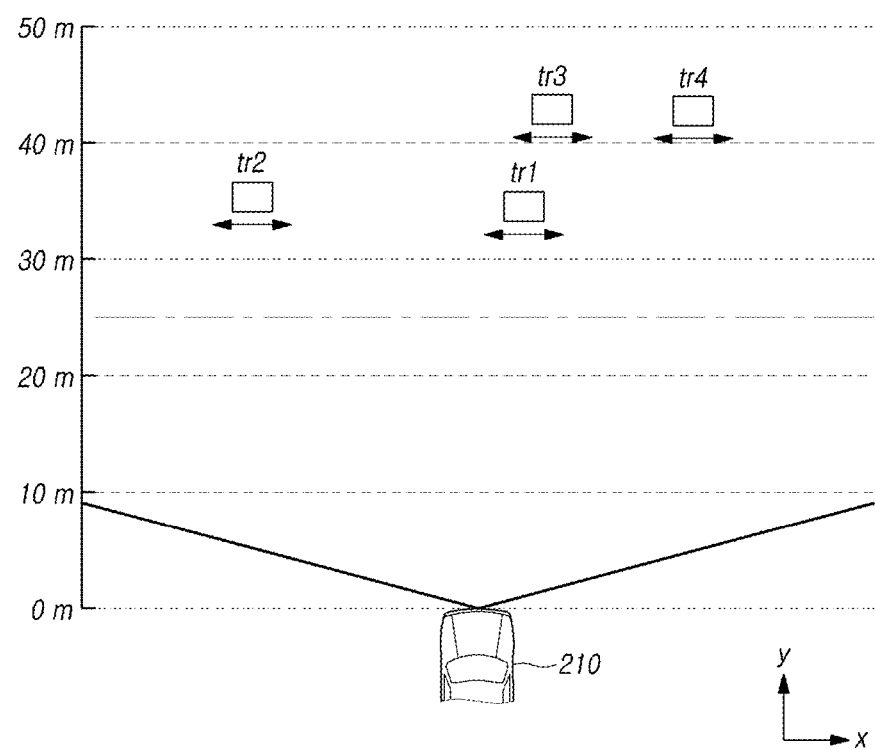
FIG. 7 illustrates an embodiment of extracting transverse location information of a reference track and each of sorted tracks.

FIG. 7 illustrates an embodiment of extracting transverse location information of each of the reference track and the sorted tracks.

Referring to FIG. 7, the track sorter 310 sorts track 2 (tr2) to track (tr4), having therebetween a relative speed difference ($\Delta v$) equal to or lower than a reference speed, as sorted tracks.

Subsequently, the histogram generator 320 extracts transverse location information of the reference track (tr1) and tracks (tr2, tr3, and tr4) in the short term and the long term.

Here, the histogram generator 320 may accumulate and store the transverse location information in order to generate histograms.

The histogram generator may comprise at least one memory.

The histogram generator 320 may generate a short-term histogram and a long-term histogram having the transverse locations of the reference track (tr1) and the tracks (tr2, tr3, and tr4) as factors.

Hereinafter, for convenience, the following description will be made on the basis of the short-term histogram and the long-term histogram for the reference track (tr1) and track 2 (tr2), which is the sorted track.

Figure 8:
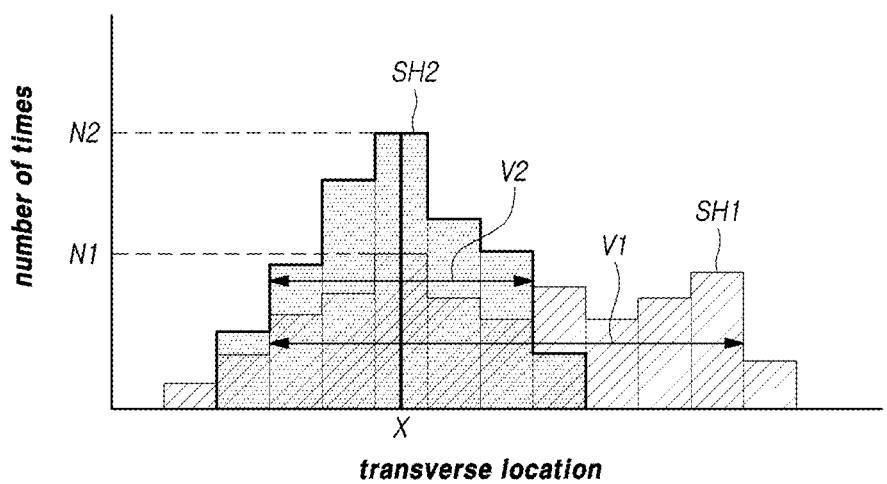
FIG. 8 illustrates histograms of the reference track and each of the sorted tracks.
Figure 9:
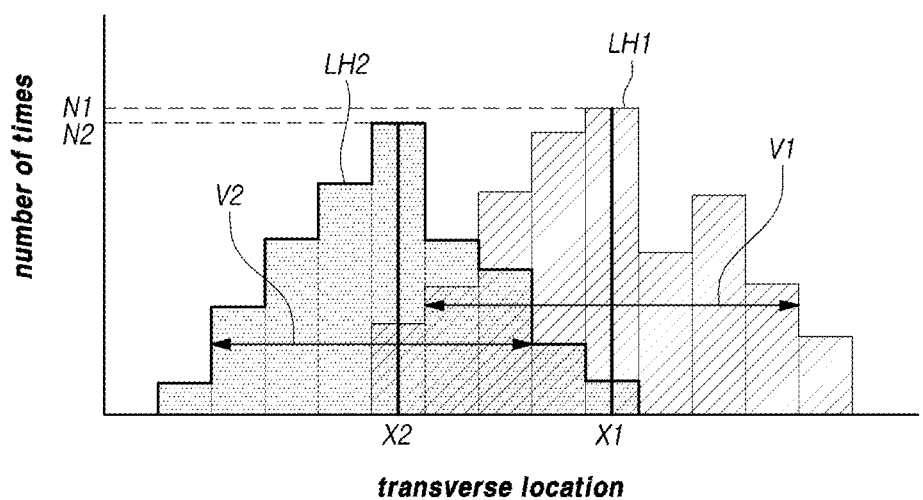
FIG. 9 illustrates long-term histograms of the reference track and each of the sorted tracks.

FIG. 8 is a short-term histogram illustrating each of the reference track and the sorted track, and FIG. 9 is a long-term histogram illustrating each of the reference track and the sorted track.

Referring to FIG. 8, the histogram generator 320 generates a short-term histogram (SH) having transverse locations of the reference track (tr1) and the sorted track (tr2) as factors.

For example, the histogram generator 320 generates a short-term histogram (SH1) of the reference track (tr1) and a short-term histogram (SH2) of the sorted track (tr2).

When the short-term histograms (SH) are generated, the identifier 330 may measure a short-term histogram similarity between the short-term histograms (SH) for the reference track (tr1) and each of one or more sorted tracks.

The short-term histogram similarity is histogram similarity between the short-term histograms (SH).

For example, the identifier 330 may measure short-term histogram similarity between the generated short-term histogram (SH1) of the reference track (tr1) and the short-term histogram (SH2) of the sorted track (tr2).

Various methods are available for measuring the short-term histogram similarity. For example, the identifier 330 may determine the histogram similarity on the basis of at least one of the maximum value of the number of times in the histogram, a transverse location value corresponding to the maximum value, and a variance value of the histogram.

In a detailed example, the identifier 330 may measure the short-term histogram similarity on the basis of a ratio $$\left(\frac{V2}{V1}\right)$$

of the variance value V2 of the short-term histogram (SH2) of the sorted track (tr2) to the variance value V1 of the short-term histogram (SH1) of the reference track (tr1) and a difference (|V1−V2|) therebetween.

Further, the identifier 330 may measure the short-term histogram similarity on the basis of OpenCV or a coefficient of Bhattacharyya. The OpenCV or the coefficient of Bhattacharyya has been described with reference to FIG. 3.

Referring to FIG. 9, the histogram generator 320 generates a long-term histogram (LH) having transverse locations of the reference track (tr1) and the sorted track (tr2) as factors.

For example, the histogram generator 320 generates a long-term histogram (LH1) of the reference track (tr1) and a long-term histogram (LH2) of the sorted track (tr2).

When the long-term histograms (LH) are generated, the identifier 320 may measure a long-term histogram similarity between the long-term histograms (LH) for the reference track (tr1) and each of one or more sorted tracks.

The long-term histogram similarity is the histogram similarity between the long-term histograms (LH).

For example, the identifier 320 may measure the long-term histogram similarity between the generated long-term histogram (LH1) of the reference track (tr1) and the long-term histogram (LH2) of the sorted track (tr2).

The methods of measuring the long-term histogram similarity are the same as the methods of measuring the short-term histogram similarity described with reference to FIG. 8.

The identifier 330 may select, as mirror track candidates, the reference track (tr1) and one track (tr2) sorted from the one or more sorted tracks, which are sorted on the basis of the measured short-term histogram similarity and long-term histogram similarity.

For example, when the short-term histogram similarity is smaller than a preset reference similarity and the long-term histogram similarity is larger than or equal to a reference similarity, the identifier 330 may select the reference track (tr1) and the sorted track (tr2) as mirror track candidates.

Specifically, the identifier 330 calculates a ratio $$\left(\frac{V2}{V1}\right)$$

of variance values of the short-term histograms (SH1 and SH2) and the long-term histograms (LH1 and LH2) and measures the short-term histogram similarity and the long-term histogram similarity.

When the short-term histogram similarity is smaller than a reference similarity (for example, 0.8) and the long-term histogram similarity is larger than a reference similarity (for example, 0.8), the identifier 330 selects the reference track (tr1) and the sorted track (tr2) as mirror track candidates.

The identifier 330 identifies the mirror track among the reference track (tr1) and the sorted track (tr2) which are selected as the mirror track candidates.

As described above, the data-processing device according to the present disclosure may more accurately identify the mirror track by selecting the mirror track candidates.

Hereinafter, a detailed method of determining the mirror track among the mirror track candidates will be described, but track 1 (tr1) and track 2 (tr2) will be described as mirror track candidates for convenience of description. Further, unless specifically mentioned otherwise, track 1 (tr1) is expressed and described as the reference track (tr1).

Figure 10:
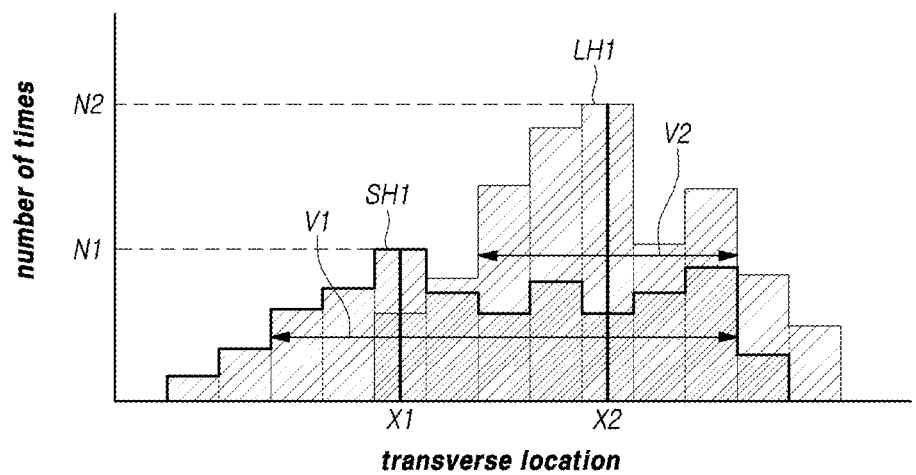
FIG. 10 illustrates a short-term histogram and a long-term histogram of the reference track.
Figure 11:
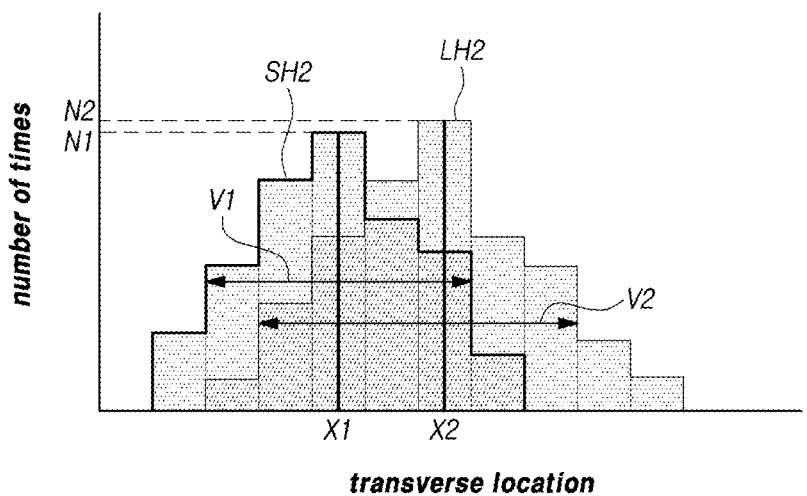
FIG. 11 illustrates a short-term histogram and a long-term histogram of the sorted track.

FIG. 10 is a short-term histogram and a long-term histogram of the reference track, and FIG. 11 is a short-term histogram and a long-term histogram of a sorted track.

Referring to FIG. 10, the identifier 330 may select, as mirror track candidates, the reference track (tr1) and the sorted track (tr2) on the basis of short-term histogram similarity and long-term histogram similarity for the reference track (tr1) and each of one or more sorted tracks, and may measure a first histogram similarity between the short-term histogram (SH1) and the long-term histogram (LH1) of the reference track (tr1) selected as the mirror track candidate.

For example, the identifier 330 may measure the first histogram similarity by calculating a ratio $$\left(\frac{V2}{V1}\right)$$

of the variance values and a ratio $$\left(\frac{N1}{N2}\right)$$

of the maximum values of the number of times between the short-term histogram (SH1) and the long-term histogram (LH1) of the reference track (tr1) selected as the mirror track candidate and averaging the same.

Referring to FIG. 11, the identifier 330 may measure a second histogram similarity between the short-term histogram (SH2) and the long-term histogram (LH2) of the sorted track (tr2) selected as the mirror track candidate.

For example, the identifier 330 measures the second histogram similarity by calculating a ratio $$\left(\frac{V1}{V2}\right)$$

of the variance values and a ratio $$\left(\frac{N1}{N2}\right)$$

of the maximum values of the number of times between the short-term histogram (SH2) and the long-term histogram (LH2) of the sorted track (tr2) selected as the mirror track candidate and averaging the same.

When the identifier 330 measures the first histogram similarity and the second histogram similarity, the identifier 330 may determine that a track of which one of the first histogram similarity and the second histogram similarity is larger than or equal to a preset reference similarity is the mirror track.

For example, when the second histogram similarity is larger than the reference similarity, the identifier 330 determines that the sorted track (tr2) corresponding to the second histogram similarity is the mirror track.

As described above, the data-processing device according to the present disclosure may accurately identify the mirror track using the characteristic of the transverse location of the mirror track.

Hereinafter, a sensing-data-processing method of implementing the present disclosure will be described.

Figure 12:
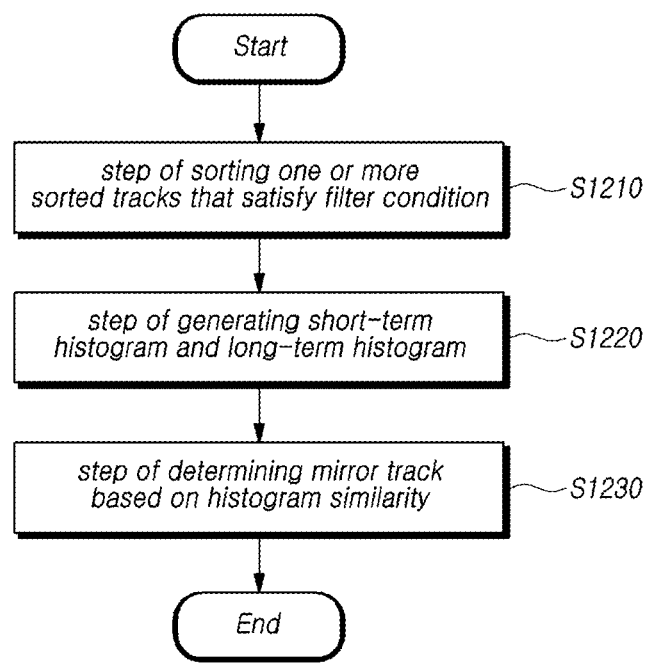
FIG. 12 is a flowchart illustrating an embodiment of a radar-signal-processing method according to the present disclosure.

FIG. 12 is a flowchart illustrating an embodiment of the data-processing method according to the present disclosure.

Referring to FIG. 12, the data-processing method according to the present disclosure may include: a step S1210 of selecting a reference track from among a plurality of generated tracks, based on sensing data captured by a radar sensor and sorting one or more sorted tracks that satisfy a preset filter condition, based on the reference track, a step 1220 of extracting transverse location information of the reference track and the one or more sorted tracks for a preset period and generating a short-term histogram and a long-term histogram having transverse locations of the reference track and each of the sorted tracks as factors, and a step S1230 of identifying a mirror track based on a histogram similarity using the short-term histogram and the long-term histogram for the reference track and each of the sorted tracks.

A detailed embodiment of determining the filter condition and the mirror will be described with reference to FIG. 13.

FIG. 13 is a flowchart illustrating another embodiment of the data-processing method according to the present disclosure.

Referring to FIG. 13, in the data-processing method according to the present disclosure, the track sorter 310 selects a reference track and calculates a longitudinal distance between the reference track and a sorted track on the basis of the reference track in S1310.

The track sorter 310 determines whether the longitudinal distance is equal to or shorter than a preset reference distance D in S1320.

When the longitudinal distance is equal to or shorter than the reference distance D, the track sorter 310 sorts sorted tracks having longitudinal distance equal to or shorter than the reference distance D, and calculates a relative speed difference ($\Delta v$) between the reference track and the sorted track in S1330.

The relative speed difference ($\Delta v$) may be calculated using the radar sensor, the Doppler Effect, and the ECU as described above.

The track sorter 310 determines whether the relative speed difference ($\Delta v$) is equal to or lower than a preset reference speed v in S1340 and sorts a sorted track having the relative speed difference, which is equal to or lower than the reference speed v, from among the sorted tracks.

The histogram generator 320 extracts transverse location information of the reference track and each of the sorted tracks and generates a short-term histogram and a long-term histogram for each of the reference track and the sorted track in S1350.

The identifier 330 measures a short-term histogram similarity SS and a long-term histogram similarity SL between the reference track and each of one or more sorted tracks and compares each of the short-term histogram similarity SS and the long-term histogram similarity SL with a preset reference similarity in S1360.

When the short-term histogram similarity SS is smaller than the reference similarity and the long-term histogram similarity SL is larger than or equal to the reference similarity, the identifier 330 selects the reference track and the sorted track as mirror track candidates in S1370.

The identifier 330 may measure a first histogram similarity of the reference track selected as the mirror track candidate and measure a second histogram similarity of the sorted track selected as the mirror track candidate. The identifier 130 determines whether one of the two histogram similarities is larger than or equal to a preset reference similarity in S1380 and determines that the track satisfying the condition is the mirror track in S1390.

For example, when the first histogram similarity is larger than or equal to the reference similarity, the identifier 330 may determine that the reference track is the mirror track.

In another example, when the second histogram similarity is larger than or equal to a reference similarity, the identifier 330 may determine that the sorted track corresponding to the second histogram similarity is the mirror track.

As described above, the present disclosure may provide a data-processing method, a data-processing device, and a vehicle control system which can accurately identify a mirror track.

Further, the present disclosure may provide a data-processing method, a data-processing device, and a vehicle control system which can prevent an accident and realize driving safety by accurately identifying a mirror track that may cause danger.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. That is, at least two elements of all structural elements may be selectively joined and operate without departing from the scope of the present disclosure. The scope of the present disclosure shall be construed on the basis of the accompanying claims in such a manner that all of the technical ideas included within the scope equivalent to the claims belong to the present disclosure.

What is claimed is:

1. An apparatus for processing data, the apparatus comprising:
    an image sensor operable to be mounted to a vehicle so as to have a field of view of an exterior of the vehicle, the image sensor being configured to capture image data;
    a radar sensor operable to be mounted to the vehicle so as to have a sensing area of an exterior of the vehicle, the radar sensor being configured to capture sensing data;
    a controller comprising at least one processor and configured to
    process at least the image data captured by the image sensor and the sensing data captured by the radar sensor;
    designate a reference track and one or more sorted tracks among a plurality of tracks generated based on a result of processing at least one of the image data and the sensing data,
    extract lateral location information of each of the reference track and each of the one or more sorted tracks, generate histograms of locations of the reference track and each of the one or more sorted tracks, compare the histograms, and identify a mirror track among the reference track and the one or more sorted tracks based on a result of the comparison.

2. The apparatus of claim 1, wherein the controller configured to select the reference track from among the plurality of tracks and sorts the one or more sorted tracks that match a preset filter condition based on the reference track.

3. The apparatus of claim 2, wherein the controller configured to sort tracks among the plurality of tracks having a longitudinal distance from the reference track equal to or shorter than a preset reference distance as the sorted tracks.

4. The apparatus of claim 2, wherein the controller configured to calculate a relative speed difference between the reference track and the plurality of tracks based on the reference track and sorts tracks having a relative speed difference equal to or lower than a preset reference speed as the sorted tracks.

5. The apparatus of claim 1, wherein the controller configured to extract the lateral location information of the reference track and the one or more sorted tracks for a preset period and generates a short-term histogram and a long-term histogram having lateral locations of the reference track and each of the one or more sorted tracks as factors.

6. The apparatus of claim 5, wherein the controller configured to preset a first period and a second period, which is longer than the first period, extract the lateral location information for the first period to generate the short-term histogram, and extract the lateral location information for the second period to generate the long-term histogram.

7. The apparatus of claim 1, wherein the controller configured to compare the short-term histogram and the long-term histogram for the reference track and each of the one or more sorted tracks and identifies a mirror track based on a histogram similarity using the short-term histogram and the long-term histogram.

8. The apparatus of claim 7, wherein the controller configured to measure a short-term histogram similarity between the short-term histograms and a long-term histogram similarity between the long-term histograms for the reference track and each of the one or more sorted tracks.

9. The apparatus of claim 8, wherein, the controller configured to select the reference track and the sorted track as mirror track candidates if the short-term histogram similarity is smaller than a preset reference similarity and the long-term histogram similarity is larger than or equal to the reference similarity.

10. The apparatus of claim 7, wherein the controller configured to:

select the reference track and the sorted track as mirror track candidates based on the short-term histogram similarity and the long-term histogram similarity for the reference track and each of the one or more sorted tracks, measures a first histogram similarity between the short-term histogram and the long-term histogram of the reference track selected as the mirror track candidate, and measure a second histogram similarity between the short-term histogram and the long-term histogram of the sorted track selected as the mirror track candidate.

11. The apparatus of claim 10, wherein the controller configured to determine that a track of which one of the first histogram similarity and the second histogram similarity is larger than or equal to a preset reference similarity is the mirror track.

12. An apparatus for processing data, the apparatus comprising:

at least one of memory;

at least one of processor communicatively connected to the at least one of memory and configured to:

select a reference track from among a plurality of tracks generated based on sensing data captured by a radar sensor and sort one or more sorted tracks that satisfy a preset filter condition, based on the reference track;

extract lateral location information of the reference track and the one or more sorted tracks for a preset period and generate a short-term histogram and a long-term histogram having lateral locations of the reference track and each of the sorted tracks as factors; and identify a mirror track based on a histogram similarity using the short-term histogram and the long-term histogram for the reference track and each of the sorted tracks.

13. The apparatus of claim 12, wherein the at least one of processor is configured to sort a track among the plurality of tracks having a lateral distance from the reference track, which is equal to or shorter than a preset reference distance, as the sorted tracks.

14. The apparatus of claim 12, wherein the at least one of processor is configured to calculate a relative speed difference between the reference track and the plurality of tracks based on the reference track and sorts tracks having a relative speed difference equal to or lower than a preset reference speed as the sorted tracks.

15. The apparatus of claim 12, wherein the at least one of processor is configured to preset a first period and a second period, which is longer than the first period, extracts the lateral location information for the first period to generate the short-term histogram, and extracts the lateral location information for the second period to generate the long-term histogram.

16. The apparatus of claim 12, wherein the at least one of processor is configured to measure a short-term histogram similarity between the short-term histograms and a long-term histogram similarity between the long-term histograms for the reference track and each of the one or more sorted tracks.

17. The apparatus of claim 16, wherein, the at least one of processor is configured to select the reference track and the sorted track as mirror track candidates if the short-term histogram similarity is smaller than a preset reference similarity and the long-term histogram similarity is larger than or equal to the reference similarity.

18. The apparatus of claim 12, wherein the at least one of processor is configured to select the reference track and the sorted track as mirror track candidates, based on the short-term histogram similarity and the long-term histogram similarity for the reference track and each of the one or more sorted tracks, measure a first histogram similarity between the short-term histogram and the long-term histogram of the reference track selected as the mirror track candidate, and measure a second histogram similarity between the short-term histogram and the long-term histogram of the sorted track selected as the mirror track candidate.

19. The apparatus of claim 12, wherein the at least one of processor is configured to determine the histogram similarity based on at least one of a maximum value of a number of times in the histogram, a lateral location value corresponding to the maximum value, and a variance value of the histogram.

20. A method of processing data, the method comprising:
- selecting a reference track from among a plurality of tracks generated based on sensing data captured by a radar sensor and sorting one or more sorted tracks that satisfy a preset filter condition, based on the reference track;
- extracting lateral location information of the reference track and the one or more sorted tracks for a preset period and generating a short-term histogram and a long-term histogram having lateral locations of the reference track and each of the sorted tracks as factors; and
- identifying a mirror track based on a histogram similarity using the short-term histogram and the long-term histogram for the reference track and each of the sorted tracks.

* * * * *